Feb. 25, 1930.                    M. S. CURTIS                    1,748,540
                       TURRET INDEXING AND LOCKING MEANS
                              Filed April 7, 1927
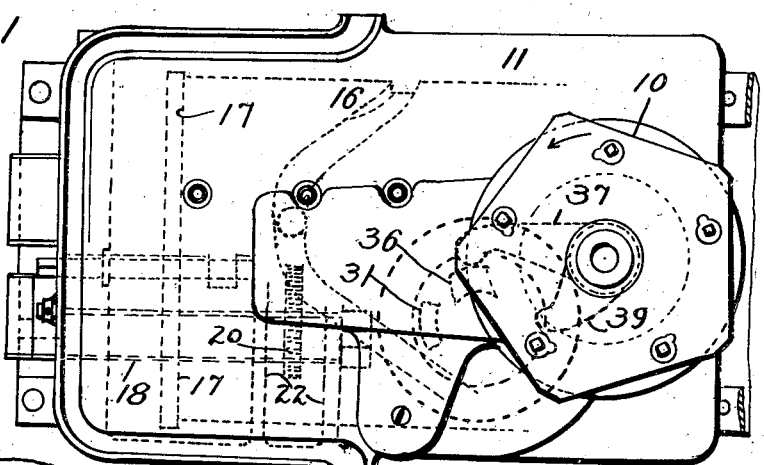
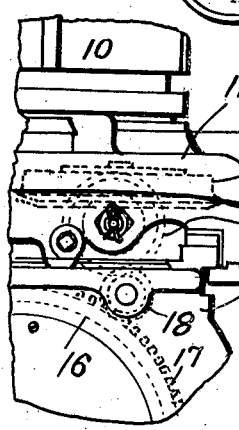
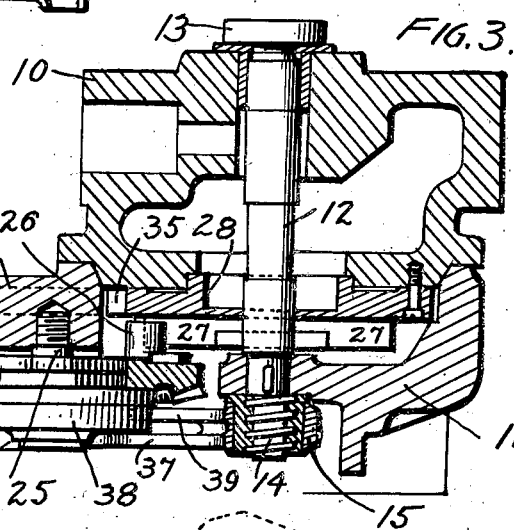
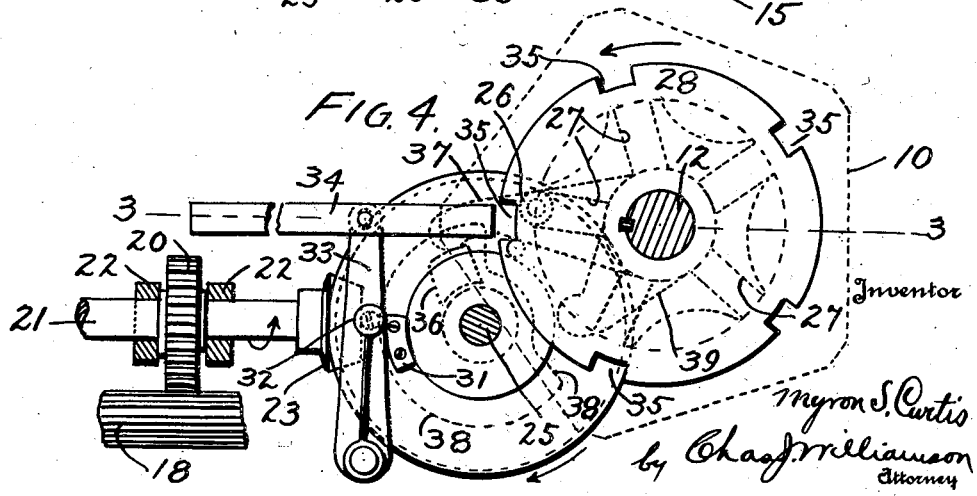
Inventor
Myron S. Curtis
by Chas. J. Williamson
Attorney Patented Feb. 25, 1930

1,748,540

UNITED STATES PATENT OFFICE

MYRON S. CURTIS, OF PAWTUCKET, RHODE ISLAND, ASSIGNOR TO POTTER & JOHNSTON MACHINE COMPANY, OF PAWTUCKET, RHODE ISLAND, A CORPORATION OF RHODE ISLAND

TURRET INDEXING AND LOCKING MEANS

Application filed April 7, 1927. Serial No. 181,858.

The object of my invention is to provide turret indexing and locking mechanism which will avoid the use of clutches or the like, and which will be efficient and positive in action, and with as much simplicity of parts as possible, consistent with the operations and functions to be performed.

My invention consists in whatever is described by or is included within the terms or scope of the appended claims.

In the drawings:

Fig. 1 is a plan view of a turret mechanism embodying my invention;

Fig. 2 is a rear elevation of a portion thereof;

Fig. 3 is a cross section on the line 4—4 of Fig. 5;

Fig. 4 is a plan view of the indexing and latch bolt devices.

The turret, 10, is mounted on and carried by a horizontal slide, 11, and is revolved for indexing around a vertical stud or post, 12, which at the top of the turret has a head, 13, screwed on the upper end of the post for the purpose of adjustment, and at its lower end has thread, 14, for a clamping nut, 15, which on its upper side bears against the underside of the surface on the slide, 11, so that by rotating the nut, the desired binding action on the turret or the release thereof may be effected.

The turret slide is reciprocated as usual by a cam drum, 16, and as will presently be explained, the turret indexing mechanism is geared to the cam drum, with no breaks in the train of gearing, so that it is assured that turret indexing must be absolutely synchronized with the forward and return movements of the turret slide.

Keyed to drum, 16, is gear, 17, which meshes with long pinion, 18, journaled in the machine base, 19. And meshing with long pinion, 18, is gear, 20, keyed to shaft, 21, but free to slide on it. The gear, 20, is moved along shaft, 21, by arms, 22, which are part of slide and straddle gear. Also keyed to shaft, 21, is bevel pinion, 23, meshed with bevel gear, 24, which revolves on stud, 25. On gear, 24, is a roller, 26, which is adapted to engage radial slots, 27, in a disc, 28, secured to the turret, so that disc 28, and gear 24, having the customary cooperating peripheral surfaces, it forms a Geneva motion whereby the turret is indexed by gear, 24. Before roll, 26, enters a slot, 27, a lug, 31, on gear, 24, strikes roll, 32, on lever, 33, and thus moves lock bolt, 34, which is pinned to lever, 33, in a direction shown by the arrow, and removes it from a radial notch, 35, in the disk, 28, which is then free to revolve. At the same time this happens, cam, 36, also on gear, 24, swings finger, 37, and loosens nut, 15, on the end of bolt, 12, and unbinds the turret. After turret has finished indexing lock bolt, 34, which is no longer held out by lug, 31, moves into an index notch, 35, and cam, 38, operates on finger, 39, and tightens nut, 15, and binds the turret.

What I claim is:

1. In a turret lathe the combination of a turret slide, a turret carried thereby, a rotatable member acting on the slide to reciprocate the slide, turret indexing mechanism, and an unbroken gear connection between said rotatable member and the turret indexing mechanism.

2. In a turret lathe the combination of a turret slide, a turret mounted thereon, turret indexing mechanism including a member attached to the turret and a coacting operating wheel, a rotating member acting to reciprocate the slide, and a constantly maintained gear connection between said member and said wheel.

3. In a turret lathe the combination of a turret slide, a turret mounted thereon, turret indexing mechanism including a member attached to the turret and a coacting operating wheel, a rotating member acting to reciprocate the slide, a constantly maintained gear connection between said member and said wheel, a latch bolt for the turret, turret binding and releasing means, and parts carried by said wheel for actuating said bolt and said turret binding and releasing means.

4. In a turret lathe the combination of a turret slide, a cam drum mounted on an axis parallel with the direction of sliding movement of the slide, means for transmitting rotation of the drum to the slide, turret indexing mechanism mounted on the slide and an unbroken gear connection between said drum and the turret indexing mechanism comprising an elongated gear in mesh with a gear moving with the slide.

5. In a turret lathe the combination of a turret slide, a turret carried thereby, a rotatable member acting on the slide to reciprocate the slide, turret indexing mechanism, an unbroken gear connection between said rotating member and the turret indexing mechanism, turret locking means, and parts carried by said rotating member for actuating said turret locking means.

6. In a turret lathe the combination of a turret slide, a turret carried thereby, a rotattable member acting on the slide to reciprocate the slide, turret indexing mechanism, and unbroken gear connection between said rotating member and the turret indexing mechanism, turret locking means, turret binding and releasing means, and parts carried by said rotating member for actuating said turret locking means and said turret binding and releasing means.

In testimony whereof I hereunto affix my signature.

MYRON S. CURTIS.